United States Patent
Zadell et al.

(10) Patent No.: US 11,427,336 B2
(45) Date of Patent: Aug. 30, 2022

(54) HIGH STRAIN TOLERANT CHORD-WISE ICE PROTECTION LAYOUT

(71) Applicant: GOODRICH CORPORATION, Charlotte, NC (US)

(72) Inventors: Alex Zadell, Willoughby, OH (US); Andrew Taylor, Hudson, OH (US)

(73) Assignee: Goodrich Corporation, Charlotte, NC (US)

( * ) Notice: Subject to any disclaimer, the term of this patent is extended or adjusted under 35 U.S.C. 154(b) by 238 days.

(21) Appl. No.: 16/829,855

(22) Filed: Mar. 25, 2020

(65) Prior Publication Data
US 2021/0300572 A1    Sep. 30, 2021

(51) Int. Cl.
*B64D 15/12* (2006.01)

(52) U.S. Cl.
CPC .......... *B64D 15/12* (2013.01); *B64D 2221/00* (2013.01)

(58) Field of Classification Search
CPC .... B64D 15/12; B64D 15/00; B64D 2221/00; B64D 2033/0233
See application file for complete search history.

(56) References Cited

U.S. PATENT DOCUMENTS

| | | | |
|---|---|---|---|
| 6,031,214 A | 2/2000 | Bost et al. | |
| 6,227,492 B1 | 5/2001 | Schellhase et al. | |
| 6,338,455 B1 | 1/2002 | Rauch et al. | |
| 2006/0043240 A1* | 3/2006 | Hindel | B64D 15/12 244/133 |
| 2006/0201933 A1* | 9/2006 | Carpino, II | B64D 13/08 219/545 |
| 2018/0115127 A1 | 4/2018 | Paulson et al. | |
| 2018/0346133 A1 | 12/2018 | Paulson et al. | |
| 2019/0071185 A1 | 3/2019 | Paulson et al. | |
| 2019/0084682 A1 | 3/2019 | Aubert et al. | |
| 2019/0145384 A1 | 5/2019 | Spandley et al. | |

FOREIGN PATENT DOCUMENTS

GB    2291575    1/1996

OTHER PUBLICATIONS

European Patent Office, European Search Report dated Aug. 2, 2021 in Application No. 21164913.2.

\* cited by examiner

*Primary Examiner* — Rodney A Bonnette
(74) *Attorney, Agent, or Firm* — Snell & Wilmer L.L.P.

(57) ABSTRACT

A heater mat for heating an airfoil having a chord, a leading edge, and a trailing edge includes a first zone element configured to heat a first chord-wise segment of the airfoil. The system further includes a second zone element configured to heat a second chord-wise segment of the airfoil that is adjacent to the first chord-wise segment of the airfoil. The system further includes a first zone busbar located at the leading edge of the heater mat and electrically coupled to the first zone element.

18 Claims, 6 Drawing Sheets

HIGH STRAIN TOLERANT CHORD-WISE ICE PROTECTION LAYOUT

FIELD

The present disclosure relates to systems and methods for heating aircraft components using heating mats and in particular, for heating airfoils of aircraft using heating mats.

BACKGROUND

Various aircraft components (such as an airfoil, a nacelle, a wing, or the like) may be subjected to relatively cold temperatures (e.g., below freezing) as well as moisture. This combination may result in ice formation on the components. In that regard, heating mats may be placed on such aircraft components at locations that are susceptible to ice formation (such as leading edges of the components). Some of these locations may be subjected to strain (e.g., outer ends of airfoil). This may be especially true for helicopter blades, which may experience significant strain, especially at outboard ends of the helicopter blades.

SUMMARY

Disclosed herein is a heater mat for heating an airfoil having a chord, a leading edge, and a trailing edge. The system includes a first zone element configured to heat a first chord-wise segment of the airfoil. The system further includes a second zone element configured to heat a second chord-wise segment of the airfoil that is adjacent to the first chord-wise segment of the airfoil. The system further includes a first zone busbar located at the leading edge of the heater mat and electrically coupled to the first zone element.

In any of the foregoing embodiments, the first zone element and the second zone element are etched to resemble a spring.

In any of the foregoing embodiments, the first zone element and the first zone busbar are formed monolithically.

Any of the foregoing embodiments may further include an inner zone element configured to heat an inboard chord-wise segment of the airfoil, and an inner zone busbar located on the trailing edge of the heater mat and electrically coupled to the inner zone element.

In any of the foregoing embodiments, the second zone element overlaps the first zone busbar.

Any of the foregoing embodiments may further include a second zone busbar located at the leading edge of the heater mat and electrically coupled to the second zone element, and a third zone element configured to heat a third chord-wise segment of the airfoil that is adjacent to the second chord-wise segment of the airfoil.

In any of the foregoing embodiments, the third zone element overlaps the second zone busbar.

In any of the foregoing embodiments, the first zone element and the first zone busbar are laid first, the second zone element and the second zone busbar are laid second, and the third zone element is laid third such that the second zone element overlaps the first zone busbar and the third zone element overlaps the second zone busbar.

In any of the foregoing embodiments, the first chord-wise segment of the airfoil is outboard relative to the second chord-wise segment of the airfoil.

Also disclosed is a heater mat for heating an airfoil having a chord, a leading edge, and a trailing edge. The heater mat includes a first zone element configured to heat a first chord-wise segment of the airfoil. The heater mat further includes a second zone element configured to heat a second chord-wise segment of the airfoil that is adjacent to the first chord-wise segment of the airfoil. The heater mat further includes a first zone busbar located at the leading edge of the heater mat and electrically coupled to the first zone element. The heater mat further includes a second zone busbar located at the leading edge of the heater mat and electrically coupled to the second zone element.

In any of the foregoing embodiments, the first zone element and the second zone element are etched to resemble a spring.

In any of the foregoing embodiments, the first zone element and the first zone busbar are formed monolithically.

Any of the foregoing embodiments may further include an inner zone element configured to heat an inboard chord-wise segment of the airfoil, and an inner zone busbar located on the trailing edge of the heater mat and electrically coupled to the inner zone element.

In any of the foregoing embodiments, the second zone element overlaps the first zone busbar.

In any of the foregoing embodiments, the first zone element and the first zone busbar are laid first, then the second zone element and the second zone busbar are laid second.

Also disclosed is a method for forming a heater mat for heating an airfoil having a chord, a leading edge, and a trailing edge. The method includes providing a first zone element and a first zone busbar electrically coupled thereto. The method further includes placing the first zone element and the first zone busbar such that the first zone busbar is located at the leading edge of the heater mat. The method further includes providing a second zone element and second zone busbar electrically coupled thereto. The method further includes placing the second zone element and the second zone busbar such that the second zone element is located adjacent to and inboard relative to the first zone element and overlaps the first zone busbar.

In any of the foregoing embodiments, the second zone busbar is located at the leading edge of the heater mat.

Any of the foregoing embodiments may further include providing an inner zone element configured to heat an inboard chord-wise segment of the airfoil, and an inner zone busbar electrically coupled thereto; and placing the inner zone element and the inner zone busbar such that the inner zone busbar is located on the trailing edge of the heater mat.

In any of the foregoing embodiments, providing the first zone element and the second zone element includes etching the first zone element and the second zone element to resemble a spring.

In any of the foregoing embodiments, the first zone element and the first zone busbar are formed monolithically.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
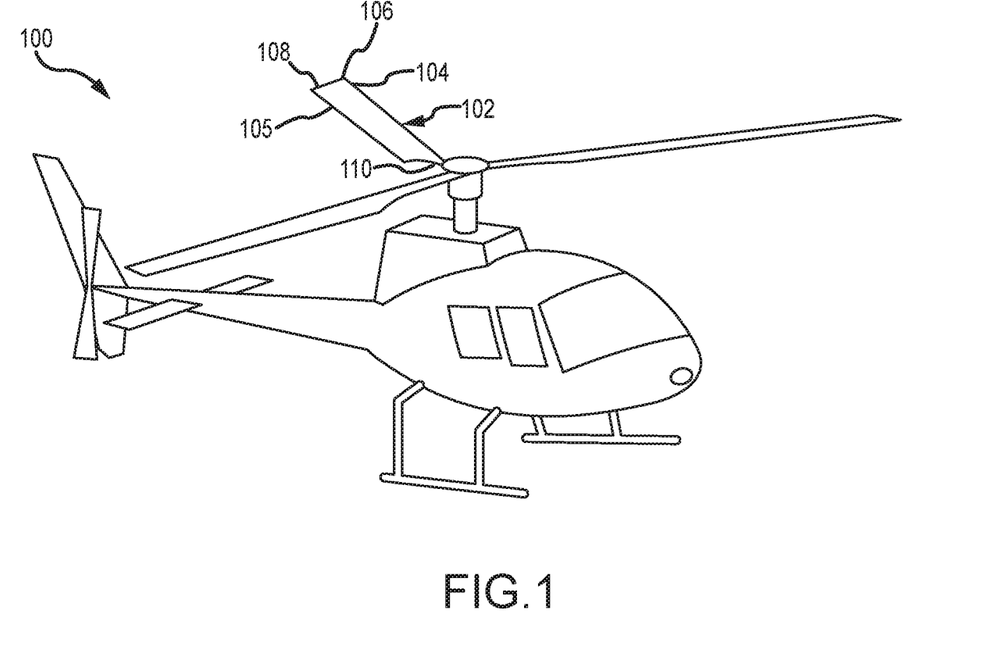
- FIG. 1 illustrates an aircraft including various airfoils, in accordance with various embodiments.

Referring now to FIG. 1, an aircraft 100 is shown. The aircraft 100 includes a plurality of airfoils 102. Although the aircraft 100 is shown as a helicopter, the features described in the present disclosure are not limited only to helicopters.

Each of the airfoils 102 may include a leading-edge 104, a trailing edge 105, and outboard end 108, and an inboard end 110. The airfoils 102 may further include a heater mat 106. The heater mat 106 may be located on the airfoils 102 and may provide thermal energy to reduce accumulation of ice. In various embodiments, the heater mat 106 may experience greater strain at the outboard end 108 than at the inboard end 110. In various embodiments, the strain may be greatest at a mid-span of the airfoils 102 where flexing is greatest. This strain location may be more prominent in rotorcraft (e.g., helicopters and tilt-rotors). Thus, the aircraft 100 may be a rotorcraft.

Conventional heater mats include a plurality of heating elements coupled together via a busbar. Conventional heater mats place the busbar on a trailing end of the airfoil. However, the trailing end may experience greater strain, especially towards an outboard end of the airfoil (in various embodiments, the strain may be greatest at a mid-span of the conventional heater mats). In that regard, the busbars of conventional heater mats may experience strain, which may damage the busbars.

Figure 2:
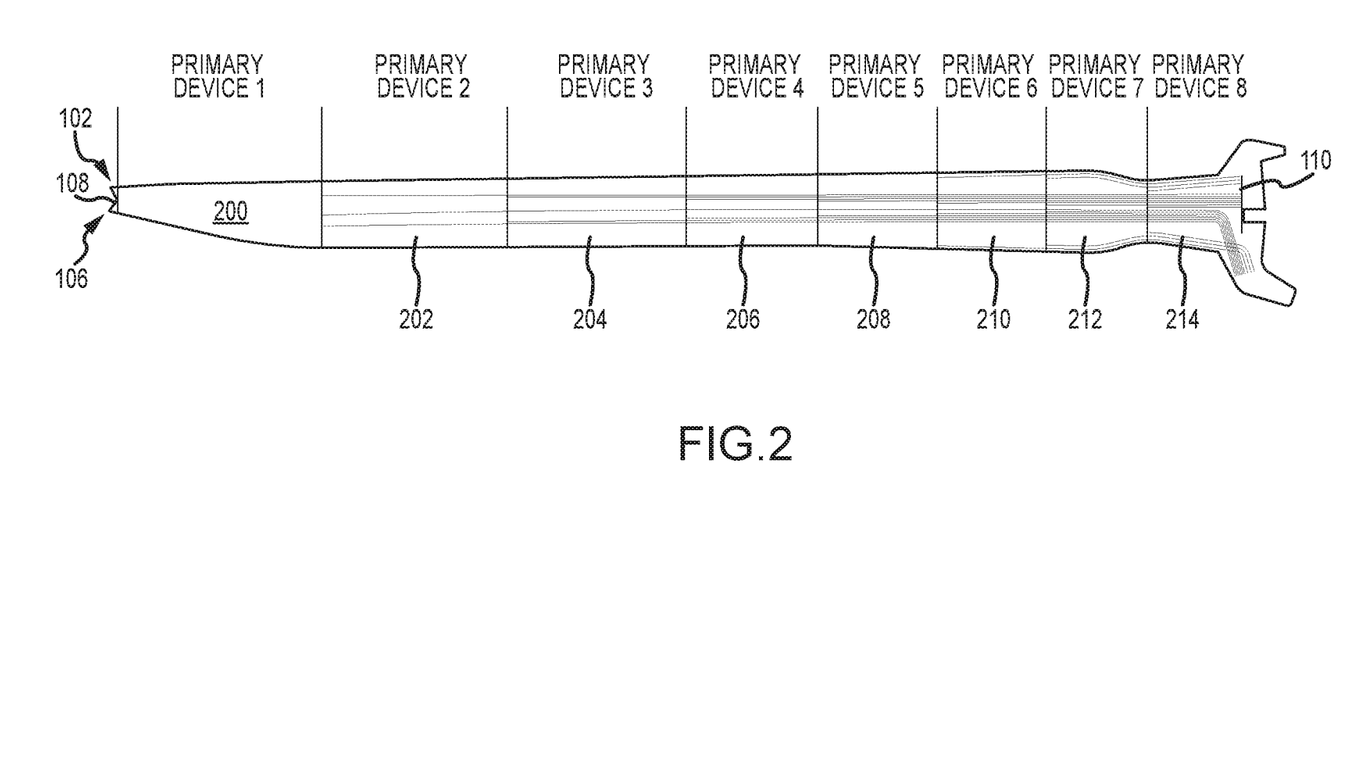
FIG. 2 illustrates a heater mat on one of the various airfoils FIG. 1, in accordance with various embodiments.

Referring now to FIG. 2, additional details of the heater mat 106 are shown. In particular, the heater mat 106 includes a first zone element 200, a second zone element 202, a third zone element 204, a fourth zone element 206, a fifth zone element 208, a sixth zone element 210, a seventh zone element 212, and an eighth zone element 214. Any of the sixth zone element 210, the seventh zone element 212, or the eighth zone element 214 may be referred to as an inner zone element as they may be located closer to the inboard end 110 than the outboard end 108. The second zone element 202 may be located adjacent to the first zone element 200 and towards the inboard end 110 relative to the first zone element 200.

The busbars for each of the first zone element 200, the second zone element 202, the third zone element 204, the fourth zone 206, and the fifth zone element 208 may be located at a leading edge of the heater mat 106. This may be because the corresponding zones of the airfoil 102 experience greater strain at the trailing edge 105 (as shown in busbar 1) than at the leading edge 104. By placing the busbars at the leading edge in the outboard five zones, the amount of strain experienced by these busbars is relatively low, thus decreasing the likelihood of a failure due to fatigue.

Figure 3A:
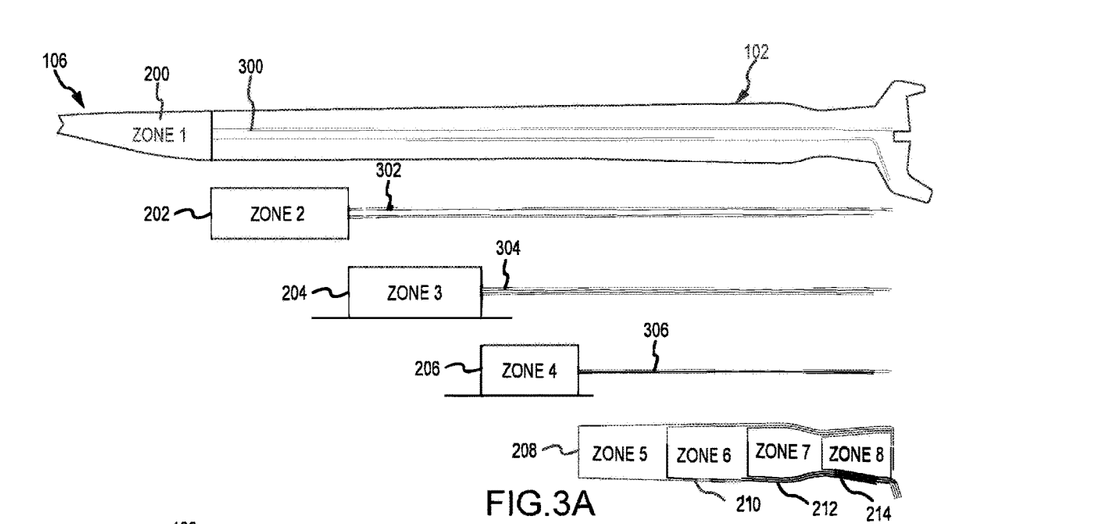
FIGS. 3A, 3B, and 4 illustrate various features of the heater mat of FIG. 2, in accordance with various embodiments.
Figure 3B:
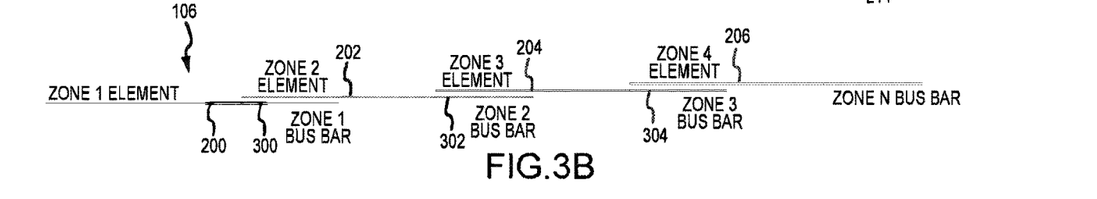
Figure 4:
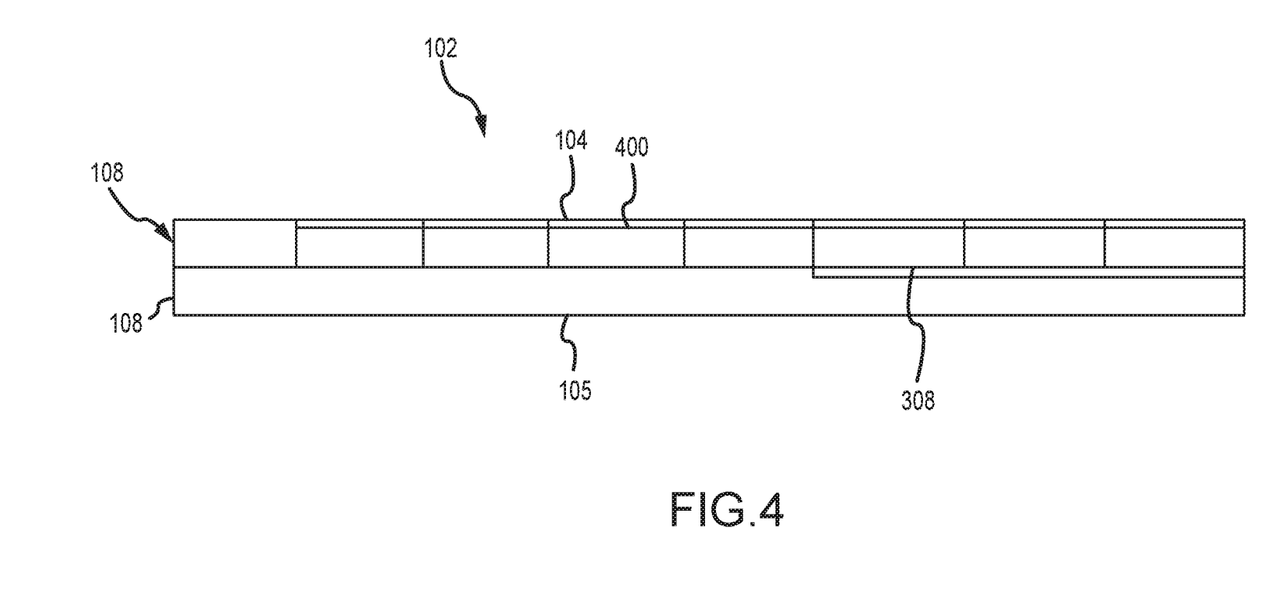

Turning now to FIGS. 3A, 3B, and 4, additional details of the heater mat 106 are shown. In particular, the first zone heating element 200 is coupled to a first zone busbar 300, the second zone element 202 is coupled to a second zone busbar 302, the third zone element 204 is coupled to a third zone busbar 304, and the fourth zone element 206 is coupled to a fourth zone busbar 306.

Figure 6:
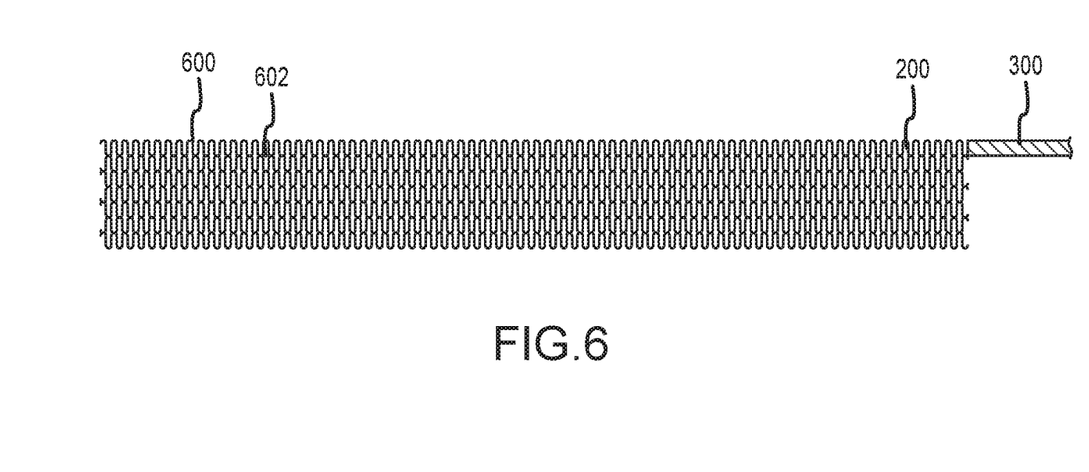
FIG. 6 illustrates features of a first zone heating element and a first zone busbar as part of the heater mat of FIG. 2, in accordance with various embodiments.

Referring briefly to FIG. 6, additional details of the first zone element 200 and the first zone busbar 300 are shown. As shown, the first zone element 200 is etched or otherwise formed to be patterned. The first zone element 200 may include any pattern such as a crisscross pattern, a basket-weave, or the like. In that regard, the first zone element 200 may include a conductive material 600 with openings 602. This patterning of the first zone element 200 may result in the first zone element 200 having a spring-like nature (i.e., the first zone element 200 may resemble a spring, which may resemble the spring-like nature of a heating element available under the tradename Duratherm® and available from Goodrich Corporation of Charlotte, N.C.). Each of the zone elements 200, 202, 204, 206, 208, 210, 212, 214 may have similar features as the first zone element 200. The spring-like nature of the elements 200, 202, 204, 206, 208, 210, 212, 214 may provide multiple redundant electrical paths for the power to be provided to each of the elements 200, 202, 204, 206, 208, 210, 212, 214.

On the other hand, the first zone busbar 300 may also include a solid strip of conductive material. The spring-like nature of the first zone element 200 results in the first zone element 200 having a greater strain tolerance than the first zone busbar 300. In various embodiments, the first zone busbar 300 may be formed monolithically with the first zone element 200. That is, a single piece of material may be etched or otherwise reduced or formed to create the first zone element 200 and the first zone busbar 300.

Referring now to FIGS. 1, 2, 3A, 3B, and 4, the first zone busbar 300, the second zone busbar 302, the third zone busbar 304, and the fourth zone busbar 306 are each located at the leading edge 104, as shown by a collection of busbars 400 and BUSBAR 4. This reduces strain on the busbars 300, 302, 304, 306 at the leading edge towards the outboard end 108 that experiences less strain than the trailing edge. Thus, this placement of the busbars 300, 302, 304, 306 may increase a lifespan of the heater mat 106.

In various embodiments, the first zone element 200, the second zone element 202, the third zone element 204, the fourth zone element 206, and the fifth zone element 208 may be referred to as outer zone elements 200, 202, 204, 206, 208 as they may be located closer to the outboard end 108 than the inboard end 110. The first zone busbar 300 may be electrically coupled to the first zone element 200, the second zone busbar 302 may be electrically coupled to the second zone element 202, the third zone busbar 304 may be electrically coupled to the third zone elements 204, and the fourth zone busbar 306 may be electrically coupled to the fourth zone element 206.

In addition, each of the first zone busbar 300, the second zone busbar 302, the third zone busbar 304s, and the fourth zone busbar 306 may include separate power and return paths for each of the first zone element 200, the second zone element 202, the third zone element 204, and the fourth zone element 206 that are routed along the leading edge 104. Providing separate power and return paths for each of the outer zone elements reduces the likelihood of failure of the entire heater mat 106 in response to failure of a single busbar. This arrangement further maximizes chordwise coverage of the heater mat 106 because it provides additional surface area of the heater mat 106 where conventional heater mats included power and return paths.

Furthermore, the fifth zone element 208, the sixth zone element 210, the seventh zone element 212, and the eighth zone element 214 may be electrically coupled to a common busbar 308. The common busbar 308 may be located at the trailing edge 105 of the heater mat 106. In various embodiments, the fifth zone element 208, the sixth zone element 210, the seventh zone element 212, and the eighth zone element 214 along with the common busbar 308 may be etched at a single time. Placement of the common busbar 308 for the elements 208, 210, 212, 214 at the trailing edge 105 rather than the leading edge 104 is because strain at the trailing edge 105 is reduced closer to the inboard end 110 relative to the outboard end 108.

Because the fifth zone element 208, the sixth zone element 210, the seventh zone element 212, and the eighth zone element 214 are located closer to the inboard and 110 than the outboard end 108, they may be referred to as inner zone elements. In various embodiments, the inner zone elements 208, 210, 212, 214 may be formed as a single zone element and, in various embodiments, the inner zone elements 208, 210, 212, 214 may be formed as separate elements. In various embodiments, the common busbar 308 may include a single busbar for the combination of inner zone elements 208, 210, 212, 214 and, in various embodiments, the common busbar 308 may include separate busbars for each of the inner zone elements 208, 210, 212, 214. In various embodiments, the separate busbars may or may not be coupled together.

In various embodiments, the outer zone elements 200, 202, 204, 206, 208 and the inner zone elements 208, 210, 212, 214 may be selected as outer zone elements or inner zone elements based on an amount of strain experienced at various locations along the corridors of the airfoil 102. For example, elements that experience greater strain on a leading edge may be selected as inner zone elements and elements that experience greater strain on a trailing edge may be selected as outer zone elements.

In various embodiments, the outer zone elements 200, 202, 204, 206, 208 and the inner zone elements 208, 210, 212, 214 may be selected as outer zone elements or inner zone elements based on a distance of each of the zone elements 200, 202, 204, 206, 208, 208, 210, 212, 214 from the inboard end 110 and the outboard end 108. For example, elements that are closer to the inboard end 110 may be selected as inner zone elements and elements that are closer to the outboard end 108 may be selected as outer zone elements. As another example, elements that are located in the 60 percent (10%) of the chord length nearest to the outboard end 108 may be selected as outer zone elements and elements that are located in the 40% of the chord length nearest to the inboard end 110 may be selected as inner zone elements.

During construction, the first zone element 200 and the first zone busbar 300 may be positioned first. Next, the second zone element 200 and the second busbar 302 may be laid such that the second zone element 200 overlays the first zone busbar 300 and the second zone element 202 is located adjacent to the first zone element 200. This may continue until all outer zone elements 200, 202, 204, 206 have been arranged. The outer zone elements 200, 202, 204, 206 may account for all areas of relatively high strain on the airfoil 102. Next, the inner zone elements 208, 210, 212, 214 may be laid along with the common busbar 308 as a single installation, or the inner zone elements 208, 210, 212, 214 and the common busbar 308 may be installed separately.

Figure 5:
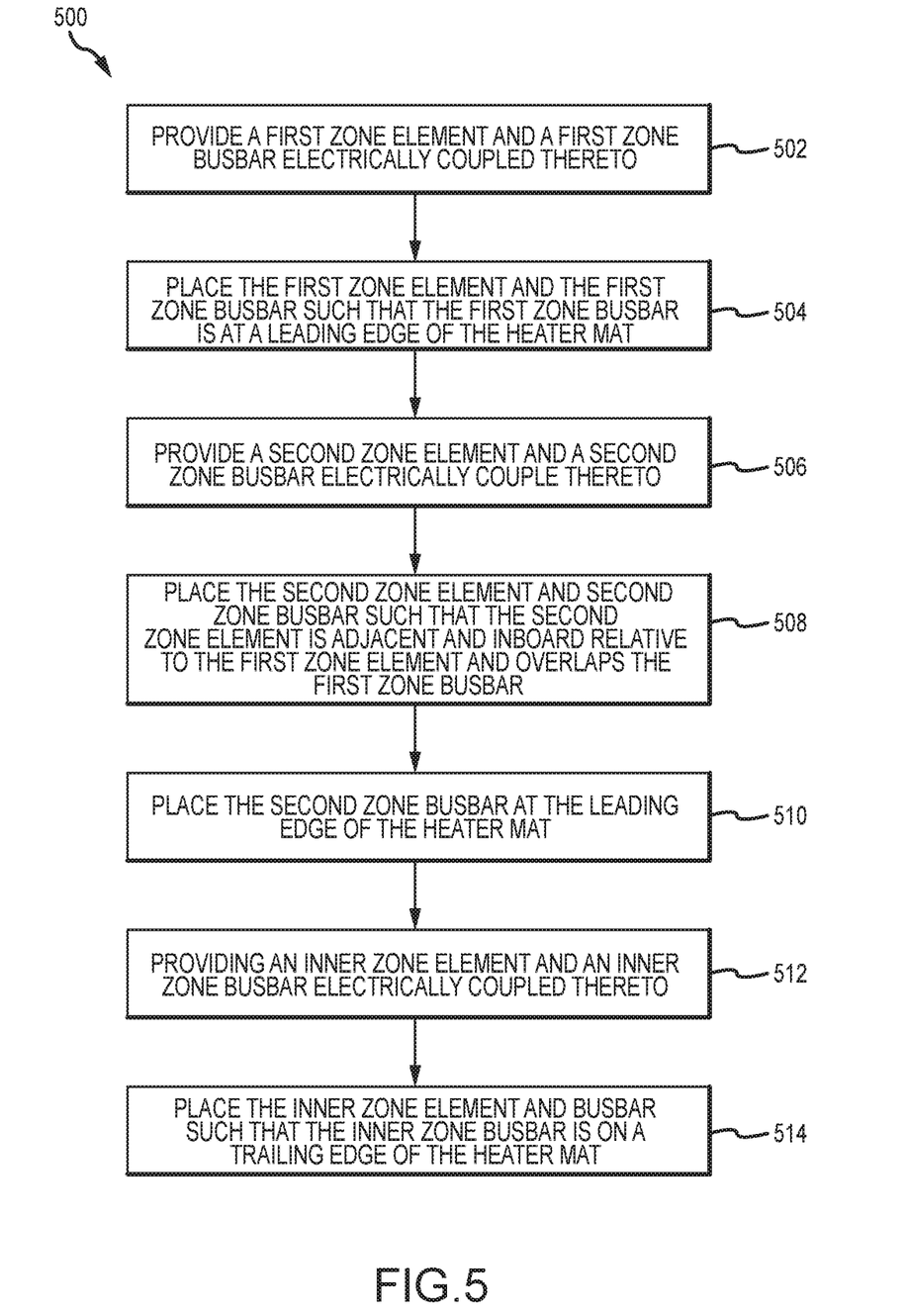
FIG. 5 illustrates a method for forming a heater mat for use on an airfoil of an aircraft, according to various embodiments.

Referring now to FIG. 5, a method 500 for forming a heater mat for use with an airfoil is shown. In block 502B, a first zone element of a first zone busbar may be provided. The first zone element may be electrically coupled to the first zone busbar. In block 504, the first zone element in the first zone busbar may be placed such that the first zone busbar is located at a leading edge of the heater mat.

In block 506, a second zone element and a second zone busbar may be provided. The second zone busbar may be electrically coupled to the second zone element. In block 508, the second zone element in second zone busbar may be installed. That is, the second zone element and the second zone busbar may be placed such that the second zone element is located adjacent to and inboard relative to the first zone element and overlaps the first zone busbar. The placement of the second zone element and the second zone busbar may be such that the second zone busbar is also located at the leading edge of the heater mat in block 510.

Blocks 502 through 510 may be repeated until all outer zone elements have been arranged.

In block 512, and inner zone element and an inner zone busbar may be provided. The inner zone busbar may be electrically coupled to the inner zone element. In block 514, the inner zone element in the inner zone busbar may be placed such that the inner zone busbar is located on a trailing edge of the heater mat.

Blocks 512 and 514 may be repeated until all inner zone elements have been installed. As mentioned above and in various embodiments, a single inner zone busbar may be provided that provides power to all inner zone heating elements.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heater mat for heating an airfoil having a chord, a leading edge, and a trailing edge, comprising:
   a first zone element configured to heat a first chord-wise segment of the airfoil;
   a second zone element configured to heat a second chord-wise segment of the airfoil that is adjacent to the first chord-wise segment of the airfoil;
   a first zone busbar located at the leading edge of the heater mat and electrically coupled to the first zone element, wherein the second zone element overlaps the first zone busbar;
   a second zone busbar located at the leading edge of the heater mat and electrically coupled to the second zone element;
   an inner zone element configured to heat an inboard chord-wise segment of the airfoil; and
   an inner zone busbar located at the trailing edge of the heater mat and electrically coupled to the inner zone element.

2. The heater mat of claim 1, wherein the first zone element and the second zone element are etched to resemble a spring.

3. The heater mat of claim 1, wherein the first zone element and the first zone busbar are formed monolithically.

4. The heater mat of claim 1, wherein the inner zone element comprises:
   a first inner zone element configured to heat a first inboard chord-wise segment of the airfoil; and
   a second inner zone element configured to heat a second inboard chord-wise segment of the airfoil that is adjacent to the first inboard chord-wise segment of the airfoil, the inboard chord-wise segment of the airfoil including the first inboard chord-wise segment and the second inboard chord-wise segment.

5. The heater mat of claim 4, wherein the inner zone busbar comprises:
   a first inner zone busbar located at the trailing edge of the heater mat and electrically coupled to the first inner zone element; and
   a second inner zone busbar located at the trailing edge of the heater mat and electrically coupled to the second inner zone element.

6. The heater mat of claim 1, further comprising a third zone element configured to heat a third chord-wise segment of the airfoil that is adjacent to the second chord-wise segment of the airfoil.

7. The heater mat of claim 6, wherein the third zone element overlaps the second zone busbar.

8. The heater mat of claim 6, wherein the first zone element and the first zone busbar are laid first, the second zone element and the second zone busbar are laid second, and the third zone element is laid third such that the second zone element overlaps the first zone busbar and the third zone element overlaps the second zone busbar.

9. The heater mat of claim 1, wherein the first chord-wise segment of the airfoil is outboard relative to the second chord-wise segment of the airfoil.

10. A heater mat for heating an airfoil having a chord, a leading edge, and a trailing edge, comprising:
    a first zone element configured to heat a first chord-wise segment of the airfoil;
    a second zone element configured to heat a second chord-wise segment of the airfoil that is adjacent to the first chord-wise segment of the airfoil;
    a first zone busbar located at the leading edge of the heater mat and electrically coupled to the first zone element;
    a second zone busbar located at the leading edge of the heater mat and electrically coupled to the second zone element;
    an inner zone element configured to heat an inboard chord-wise segment of the airfoil; and
    an inner zone busbar located at the trailing edge of the heater mat and electrically coupled to the inner zone element.

11. The heater mat of claim 10, wherein the first zone element and the second zone element are etched to resemble a spring.

12. The heater mat of claim 10, wherein the first zone element and the first zone busbar are formed monolithically.

13. The heater mat of claim 10, wherein the second zone element overlaps the first zone busbar.

14. The heater mat of claim 10, wherein the first zone element and the first zone busbar are laid first, then the second zone element and the second zone busbar are laid second such that the second zone element overlaps the first zone busbar, the second zone element being located closer to an external surface of the airfoil as compared the first zone busbar.

15. A method for forming a heater mat for heating an airfoil having a chord, a leading edge, and a trailing edge, the method comprising:
providing a first zone element and a first zone busbar electrically coupled thereto;
placing the first zone element and the first zone busbar such that the first zone busbar is located at the leading edge of the heater mat, the first zone element being configured to heat a first chord-wise segment of the airfoil;
providing a second zone element and second zone busbar electrically coupled thereto;
placing the second zone element and the second zone busbar such that the second zone element is located adjacent to and inboard relative to the first zone element and overlaps the first zone busbar, the second zone element being configured to heat a second chord-wise segment of the airfoil that is adjacent to the first chord-wise segment of the airfoil;
providing an inner zone element and an inner zone busbar electrically coupled thereto; and
placing the inner zone element and the inner zone busbar such that the inner zone busbar is located at the trailing edge of the heater mat and the inner zone element is configured to heat an inboard chord-wise segment of the airfoil.

16. The method of claim 15, wherein the second zone busbar is located at the leading edge of the heater mat.

17. The method of claim 15, wherein providing the first zone element and the second zone element includes etching the first zone element and the second zone element to resemble a spring.

18. The method of claim 15, wherein providing the first zone element and the first zone busbar includes forming the first zone element and the first zone busbar monolithically from a single piece of material.

* * * * *